Patented July 13, 1937

2,087,076

UNITED STATES PATENT OFFICE 2,087,076

INTENSIFIED FRUIT FLAVOR

Daniel V. Wadsworth and Leonard Wickenden, Manhasset, N. Y.

No Drawing. Application October 24, 1934, Serial No. 749,819. Renewed February 27, 1937

9 Claims. (Cl. 99—142)

This invention relates to intensified fruit syrups of a kind suitable for flavoring foods such as ice cream, jams, jellies, soda fountain drinks, etc., as well as for general use where a fruit flavor is desired.

A particular object of the invention is to provide a fruit flavor with excellent keeping qualities that will retain the full taste and flavor of the fresh fruit, and which is produced without boiling or freezing.

The invention produces a concentrated or intensified fruit syrup that contains substantially all of the flavoring elements originally contained in from two to five times its volume of the fresh fruit product. This concentrated product can be economically prepared at plants located in the fruit-growing regions, and it can then be shipped to points of consumption at much lower cost than could the original fruits themselves, due to its concentrated form and to the fact that refrigeration is unnecessary.

In general the invention contemplates the addition of a combination of sugars, preferably a monosaccharide and a polysaccharide sugar, to form a heavy syrup in combination with small percentages of acid and/or alcohol.

While preferred forms of the invention are disclosed herein for purposes of illustration it should be understood that various changes may be made without departing from the spirit of the invention herein set forth and claimed.

The present application relates to an improvement on the inventions disclosed in Serial No. 564,710, filed September 23, 1931 which has been abandoned in favor of later applications, and in Serial No. 647,412, filed December 15, 1932.

The invention will be described in detail as applied to the preparation of fruit flavoring syrups, although it is equally applicable to products such as preserves where some or all of the fruit pulp is retained in the finished syrup.

Food products in which fruit flavors are used are usually sweetened, hence a relatively high percentage of sugar can be used in flavoring syrups, and for this reason the present invention relies mainly on the preservative action of sugar.

We have found that where only sugar is added to the fresh fruit juice the sugar must be added in such an amount that the total soluble solids, including sugars, fruit acids and other soluble constituents of the fruit, constitute 75% by weight of the total weight of the syrup. In other words, 75% of the weight of the syrupy portion of the finished product must be soluble solids.

The only common sugar that forms a syrup of this required density at room temperature without crystallization is levulose (d fructose), but this sugar is so sweet that a syrup of the required concentration would be too sweet for food purposes. No other sugar taken alone will form a solution of the required concentration, but we have discovered various combinations of sugars that may be used to produce the desired result.

As a general proposition it may be stated that the keeping qualities of a syrup depend upon the osmotic pressure exerted by the molecules in solution. The molecules of monosaccharide sugars are much smaller than the molecules of polysaccharide sugars, so that with syrups of the same density, the syrup formed with a monosaccharide sugar will have a larger number of molecules in solution than the syrup formed with a polysaccharide sugar. For example, the molecule of the monosaccharide levulose is approximately half the size of the molecules of the polysaccharide sucrose, so that in syrups of the same density prepared from these two sugars, the levulose syrup would contain approximately twice as many molecules as that prepared with sucrose.

We have found that the best fresh fruit product in syrupy form, whether concentrated fruit juice, crushed fruits, preserves, or similar products, should include one or more monosaccharide sugars in combination with one or more polysaccharide sugars in order to give the product a high proportion of sugar molecules for satisfactory keeping qualities while avoiding excessive sweetness or a tendency for the sugars to crystallize.

The term "polysaccharide sugar" as used herein is broad enough to include disaccharide sugars, as well as trisaccharide sugars and other polysaccharide sugars. The preferred polysaccharide sugar for our process is the disaccharide sucrose, because of its low cost and ready availability, but this sugar may be replaced or supplemented by the disaccharides maltose or lactose, or by the trisaccharide raffinose, or by any equivalent water-soluble polysaccharide sugar.

The monosaccharides levulose and dextrose are well adapted to our process and may readily be obtained by the inversion of sucrose to form ordinary invert syrup, which contains equal parts of dextrose and levulose. Other monosaccharide sugars, such as fructose, glucose, or galactose may also be used.

In carrying out our process with a monosaccharide sugar and a disaccharide sugar, we have found that a proper balance of the desired qualities may be obtained in syrups where the sum of twice the per cent by weight of monosaccharide and the per cent by weight of disaccharide divided by the per cent by weight of water gives a value of 4.4 or higher. The formula for this safety factor is expressed as follows:

$$\frac{2M+D}{W}=4.4$$

where M=per cent monosaccharide by weight
D=per cent disaccharide by weight
W=per cent water by weight If a trisaccharide or other polysaccharide sugar is used to replace or supplement the disaccharide sugar, the formula can be adjusted to allow for the difference in proportions that would be necessitated by the difference in size between the molecule of the disaccharide and the molecule of the trisaccharide.

Some fruit juices contain an appreciable amount of fruit acid, such as lemon juice with from 4 to 8% acid and orange juice with from 0.3 to 2.6% acid.

The molecular weight of citric acid is 192, which is approximately equivalent to the molecular weight of levulose, 180, while the molecular weight of malic acid is 134. These are typical fruit acids and we can therefore legitimately consider fruit acids as approximately equivalent to the monosaccharides. The formula for the safety factor then becomes:

$$\frac{2(M+A)+D}{W}=4.4$$

where M=per cent monosaccharide by weight
A=per cent fruit acid by weight
D=per cent disaccharide by weight
W=per cent water by weight Quite apart from the osmotic pressure exerted by their molecules, the fruit acids check the growth of many organisms, and in this way further assist the preserving action.

In some cases it is found desirable to add to the syrup a small percentage of alcohol, which inhibits the action of enzymes that cause a deterioration of the fruit flavor, and which also inhibits fermentation and mold.

When alcohol is added the percentage of water is reduced, and the formula for the safety factor then becomes:

$$\frac{2(M+A)+D}{W-a}=4.4$$

where M=per cent monosaccharide by weight
A=per cent fruit acid by weight
D=per cent disaccharide by weight
W=per cent water by weight
a=per cent alcohol by weight Thus, a satisfactory grapefruit syrup contains the following:

Soluble solids=71.6% { Sucrose_____ 34.4
Invert sugars_____ 29.2
Fruit acid_____ 3.4

Water=25.2%
Alcohol=3.2%

Applying these figures to the safety formula we obtain the following:

$$\frac{2(29.2+3.4)+34.4}{25.2-3.2}=4.5$$

In all cases approximately 75% of the weight of finished syrup should consist of soluble solids, or of soluble solids plus alcohol. In other words, there should be 3 parts of soluble solids, or of soluble solids plus alcohol, to 1 part of water. These figures apply to the preferred forms of the invention, but it is possible to make usable products with somewhat lower percentages of soluble solids, the keeping qualities of the syrup decreasing with the decrease in soluble solids.

The several preserving agents may be present within the following limits:

|  | Per cent by weight in total weight |
|---|---|
| Acid | 2 to 15 |
| Alcohol | 2 to 5 |
| Monosaccharide | 25 to 45 |
| Disaccharide | 25 to 45 |

In all cases the percentage of monosaccharide in the finished product should be equal to, or greater than the percentage of disaccharide, and the sugars together should total approximately 55% or more by weight of the total weight.

The desired proportions of the different sugars can be added directly to the fruit juice, or the monosaccharide sugar can be formed in the syrup by causing the inversion of some sucrose.

While sugars may be combined with fresh fruit juice in the proportions indicated above to produce a usable fruit syrup without any additional treatment, we prefer to form a concentrated or intensified syrup which contains substantially all of the flavoring constituents originally contained in from two to five times its volume of the original juice. This intensified syrup is preferably produced by a simple and economical method involving evaporation.

This evaporation method is carried out by first mixing with the fresh fruit juice a sugar or sugars to form a heavy syrup. The density of this syrup may vary according to the nature of the juice being treated, but it should preferably contain approximately 50% or more of soluble solids.

Water is then evaporated from this syrup by passing over it a current of warm air. The temperature of this air will depend somewhat upon the kind of fruit undergoing concentration. In the case of delicately flavored fruits, such as the citrus fruits, the temperature will range from 100 to 130° F. In the case of other fruits, such as cherry, whose flavor is not injured by higher temperatures, the range will be from 130 to 160° F.

During evaporation the syrup may be slowly stirred to avoid beating air into it, or it may be left unstirred, reliance being placed on the fact that the heavier material falls to the bottom, thereby maintaining a uniform consistency.

The addition of the sugar to the juice before evaporation helps to retain flavor, checks oxidation or enzymic action, avoids foaming or the formation of a scum such as is liable to occur when the juice is evaporated without addition of sugar, and prevents fermentation or deterioration of the juice before it has reached a high density.

In all cases the final syrup should contain a combination of monosaccharide and polysaccharide sugars, as described above. This can be done by adding to the fresh juice both kinds of sugar in proper proportions, or by adding a partially inverted sugar syrup rich in levulose. Or with fruit juices that naturally contain some invertase only sucrose need be added, partial inversion taking place during evaporation.

Usually the total amount of added sugar present in the finished syrup is mixed at the beginning of the process with part of the fresh juice to form a heavy syrup. After this starting syrup has been evaporated to increase its density, fresh juice is added to reduce its density to about the starting density. Such evaporation and addition of fresh juice can be carried on either alternately or continuously until the syrup has reached the desired flavor concentration and is at the proper density.

The amount of concentration or intensification possible varies with different syrups, but it is limited by practical considerations. Since the finished product should be sufficiently fluid to be pumped or poured from a container, it should not contain more than 80% of soluble solids, and hence it can be stated that in general the finished syrup should contain from 75 to 80% of soluble solids, or of soluble solids and alcohol.

Other important limiting factors are that sugars must be present in sufficient amounts to total approximately 55% or more by weight of the total weight of the finished syrup, and that the original fruit juices contain varying amounts of solids in solution.

Some fruit juices are relatively high in solids, for example grape juice, which has a soluble solid content of approximately 18%. With this juice an intensification of 3 to 1, that is, the production of 1 gallon of finished syrup containing the flavoring matter of 3 gallons of fresh grape juice, can be made, resulting in a finished syrup containing 75% of soluble solids before alcohol has been added. Any attempt to produce an intensification substantially higher than 3 to 1 would produce a syrup too heavy for practical handling.

Other fruit juices are relatively low in solids, such as raspberry juice with 9.5% soluble solids, and which can be intensified to 5 to 1.

Sometimes even with a juice having a relatively low soluble content it is still impracticable to make a 5 to 1 concentration. For instance, loganberry juice with a solid content of about 11% has such a high pectin content that when the concentration reaches about 3 to 1 the syrup begins to jell and will not flow any longer.

In a process preferred at present for applying the evaporation method to orange juice an initial syrup is formed by adding to some of the juice enough sucrose and partially inverted sucrose syrup containing levulose to form a syrup containing 69% sugars and about 1% other soluble solids. Water is then evaporated from this syrup by passing over it a stream of air heated to between 100 and 130° F. until its density is raised to 72% total soluble solids. This evaporated water is then replaced by enough fresh juice to lower the density to 70% total solids, and water is again evaporated from the syrup. This alternate evaporation and addition of fresh juice is continued until one gallon of the syrup contains everything except the water that was originally contained in three gallons of the fresh orange juice and the syrup has a density of about 75% solids. The fact that evaporation without boiling has taken place only when the juice is in the form of a heavy syrup has held substantially all of the flavoring constituents of the fruit juice in the syrup, and the fact that high percentages of sugars are present will give it excellent keeping qualities. However, in order to act as a further preservative in the manner explained above, a small percentage of alcohol, approximately 2.5%, is added to the syrup. This percentage is so slight as to be unnoticeable to the taste, but it has a marked action in preventing any change or deterioration of the flavor of the finished syrup.

A typical intensified orange syrup produced by this process has the following composition:

Solids = 73.2 {Sucrose............... 34.0
Invert sugars......... 34.0
Fruit acid............ 5.2
Water = 24.2
Alcohol = 2.4

Applying these figures to the safety formula we obtain the following:

$$\frac{2(34+5.2)+34}{24.4-2.4}=5.1$$

The result, 5.1, is above the factor 4.4 and this syrup will have excellent keeping qualities.

It has been explained above that in all preferred forms of the invention approximately 75% of the weight of the finished syrup should consist of non-water constituents (soluble solids or soluble solids plus alcohol). A syrup of this density can be handled efficiently and will keep almost indefinitely without being placed in cold storage. As the density is raised above this figure the syrup becomes more difficult to handle, and above a density of 80% handling is so difficult as to be impractical. As the density is lowered below 75% the keeping qualities of the syrup are impaired.

We claim:

1. A fluid fruit flavor comprising a heavy syrup containing approximately from 2 to 15% by weight of fruit acid, and containing approximately 55% or more by weight of sugars, half or more of which is monosaccharide sugar and the remainder of which is polysaccharide sugar, and sufficient additional soluble solids to total approximately 75 to 80% by weight of the syrup, and containing unfrozen, unboiled and substantially unchanged all of the flavoring and aromatic constituents of the fresh fruit juice.

2. A concentrated fruit flavor comprising a heavy syrup containing unfrozen, unboiled and substantially unchanged all of the flavoring and aromatic constituents of two or more times its volume of the fresh fruit juice, and containing water, fruit acid, a monosaccharide sugar and a disaccharide sugar, these constituents being present in such proportions that a value of 4.4 or higher is obtained when their percentages by weight are substituted in the formula $$\frac{2(M+A)+D}{W}$$

where M = per cent monosaccharide by weight
A = per cent fruit acid by weight
D = per cent disaccharide by weight
W = per cent water by weight 3. A fluid fruit flavor comprising a heavy syrup containing approximately 2 to 5% by weight of alcohol, and containing approximately 55% or more by weight of sugars, including a monosaccharide sugar and a polysaccharide sugar, and sufficient additional soluble solids to total approximately 70 to 78% by weight of the syrup, and containing unfrozen, unboiled and substantially unchanged all of the flavoring and aromatic constituents of the fresh fruit juice.

4. A fluid fruit flavor comprising a heavy syrup containing approximately 55% or more by weight of sugars half or more of which is monosaccharide sugar and the remainder of which is polysaccharide sugar, and containing approximately 70 to 78% by weight of total soluble solids, and containing 2 to 5% by weight of alcohol, and containing unfrozen, unboiled and substantially unchanged all of the flavoring and aromatic constituents of two or more times its volume of the fresh fruit juice.

5. A fluid fruit flavor comprising a heavy syrup containing approximately 2 to 5% by weight of alcohol, and containing approximately 55% or more by weight of sugars, including a monosaccharide sugar and a polysaccharide sugar, and containing from 2 to 15% of fruit acid, and additional soluble solids in such an amount that when added with the percentage of fruit acid and the percentage of sugars they total approximately 70 to 78% by weight of the syrup, and containing unfrozen, unboiled and substantially unchanged all of the flavoring and aromatic constituents of two or more times its volume of the fresh fruit juice.

6. A concentrated fruit flavor comprising the following constituents:

| | Per cent by weight in total weight |
|---|---|
| Fruit acid | 2 to 15 |
| Alcohol | 2 to 5 |
| Monosaccharide sugar | 25 to 45 |
| Polysaccharide sugar | 25 to 45 | and containing unfrozen, unboiled and substantially unchanged all of the flavoring and aromatic constituents of two or more times its volume of the fresh fruit juice.

7. A concentrated fruit flavor comprising a heavy syrup containing unfrozen, unboiled and substantially unchanged all of the flavoring and aromatic constituents of two or more times its volume of the fresh fruit juice, and containing water, alcohol, fruit acid, a monosaccharide sugar and a disaccharide sugar, these constituents being present in such proportions that a value of 4.4 or higher is obtained when their percentages by weight are substituted in the formula $$\frac{2(M+A)+D}{W-a}$$

where $M$ = per cent monosaccharide by weight
$A$ = per cent fruit acid by weight
$D$ = per cent disaccharide by weight
$W$ = per cent water by weight
$a$ = per cent alcohol by weight.

8. A fluid fruit flavor comprising a heavy syrup containing approximately from 2 to 15% by weight of fruit acid, and containing approximately 55% or more by weight of sugars, including a monosaccharide sugar and a polysaccharide sugar, and containing sufficient additional non-water constituents to bring the total of non-water constituents to approximately 75% by weight of the syrup, and containing unfrozen, unboiled, and substantially unchanged all of the flavoring and aromatic constituents of the fresh fruit juice.

9. A fluid fruit flavor comprising a heavy syrup containing approximately from 2 to 15% by weight of fruit acid, and containing approximately 55% or more by weight of sugars, including a monosaccharide sugar and a polysaccharide sugar, and sufficient additional soluble solids to bring the total of soluble solids to approximately 75% by weight of the syrup, and containing unfrozen, unboiled, and substantially unchanged all of the flavoring and aromatic constituents of the fresh fruit juice.

DANIEL V. WADSWORTH.
LEONARD WICKENDEN.